United States Patent
Atkins et al.

(10) Patent No.: US 10,603,814 B2
(45) Date of Patent: Mar. 31, 2020

(54) EXTRUSION COMPONENTS FOR HONEYCOMB BODIES

(71) Applicant: Corning Incorporated, Corning, NY (US)

(72) Inventors: Slater Kent Atkins, Pembroke, VA (US); Thomas William Brew, Corning, NY (US); Darin Wayne Felty, Elliston, VA (US); Tushar Gulati, Painted Post, NY (US); Min Shen, Horseheads, NY (US); Mark Allen Spetseris, Pine City, NY (US); Eric Lee Thompson, Livonia, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/077,122

(22) PCT Filed: Feb. 13, 2017

(86) PCT No.: PCT/US2017/017651
§ 371 (c)(1),
(2) Date: Aug. 10, 2018

(87) PCT Pub. No.: WO2017/139752
PCT Pub. Date: Aug. 17, 2017

(65) Prior Publication Data
US 2019/0030753 A1 Jan. 31, 2019

Related U.S. Application Data

(60) Provisional application No. 62/295,384, filed on Feb. 15, 2016, provisional application No. 62/294,199, filed on Feb. 11, 2016.

(51) Int. Cl.
*B29C 48/11* (2019.01)
*B28B 3/26* (2006.01)
(Continued)

(52) U.S. Cl.
CPC ............ *B28B 3/269* (2013.01); *B29C 48/11* (2019.02); *B29C 48/30* (2019.02); *B28B 2003/203* (2013.01)

(58) Field of Classification Search
CPC ................... B29C 48/11; B28B 3/269
See application file for complete search history.

(56) References Cited

U.S. PATENT DOCUMENTS

| 3,947,214 A | 3/1976 | Cunningham |
| 4,233,351 A | 11/1980 | Okumura et al. |

(Continued)

FOREIGN PATENT DOCUMENTS

| CN | 101549523 A | 10/2009 |
| WO | 2017087758 A1 | 5/2017 |

OTHER PUBLICATIONS

International Search Report and Written Opinion of the International Searching Authority; PCT/US2017/017651; dated May 9, 2017; 12 Pages; European Patent Office.

(Continued)

*Primary Examiner* — Timothy Kennedy

(57) ABSTRACT

A honeycomb extrusion die assembly (10) comprising a honeycomb extrusion die (701) and a forming plate (800) to block batch flow to at least a portion of a skin forming region. The honeycomb extrusion die (701) comprising a step cut discharge surface (758, 760) in the skin forming region and at least some slots (722) each with a divot (312) spaced toward a discharge surface (710) from a feedhole-slot intersection and a wide portion at the discharge surface (710) extending into the die body to the divot (312) to strengthen a peripheral region of a honeycomb extrudate in a reinforcement region, and a bulk nominal section corresponding to a bulk region of the honeycomb body.

5 Claims, 2 Drawing Sheets

(51) Int. Cl.
 *B29C 48/30* (2019.01)
 *B28B 3/20* (2006.01)

(56) References Cited

U.S. PATENT DOCUMENTS

| | | | |
|---|---|---|---|
| 4,278,412 | A | 7/1981 | Ozaki et al. |
| 4,333,896 | A | 6/1982 | Cunningham |
| 4,349,329 | A | 9/1982 | Naito et al. |
| 4,668,176 | A | 5/1987 | Zeibig et al. |
| 4,915,612 | A | 4/1990 | Gangeme et al. |
| 5,952,079 | A | 9/1999 | Andou et al. |
| 6,080,348 | A | 6/2000 | Shalkey |
| 6,287,103 | B1 | 9/2001 | Miyazaki |
| 6,299,813 | B1 | 10/2001 | Brew et al. |
| 6,343,923 | B1 | 2/2002 | Cunningham et al. |
| 6,413,072 | B1 | 7/2002 | Brew et al. |
| 6,455,124 | B1 | 9/2002 | Beall et al. |
| 7,163,389 | B2 | 1/2007 | Miyazaki et al. |
| 7,914,724 | B2 | 3/2011 | Bookbinder et al. |
| 8,348,659 | B2 | 1/2013 | Foster et al. |
| 8,591,287 | B2 | 11/2013 | Folmar et al. |
| 9,475,245 | B2 | 10/2016 | Brew et al. |
| 2004/0161583 | A1 | 8/2004 | Brew et al. |
| 2006/0178769 | A1 | 8/2006 | Brew et al. |
| 2007/0026188 | A1 | 2/2007 | Bookbinder et al. |
| 2009/0028979 | A1 | 1/2009 | Asaoka |
| 2009/0028981 | A1 | 1/2009 | Asaoka |
| 2010/0052205 | A1 | 3/2010 | Brew et al. |
| 2010/0301515 | A1 | 12/2010 | Brew et al. |
| 2011/0052745 | A1 | 3/2011 | Corbett et al. |
| 2014/0060253 | A1 | 3/2014 | Brew et al. |

OTHER PUBLICATIONS

International Search Report and Written Opinion of the International Searching Authority; PCT/US2017/017653; dated May 30, 2017; 14 Pages; European Patent Office.
English Translation of CN201780011196.6 Office Action dated Jul. 12, 2019; 6 Pages; Chinese Patent Office.
Japanese Patent Application No. 2018542742; Notice of Allowance dated Sep. 25, 2019; Japan Patent Office; 3 pgs.

EXTRUSION COMPONENTS FOR HONEYCOMB BODIES

CROSS-REFERENCE TO RELATED APPLICATION

This application is a national stage application under 35 U.S.C. § 371 of International Patent Application Serial No. PCT/US2017/017651, filed on Feb. 13, 2017, which claims the benefit of priority to U.S. Provisional Patent Application Ser. No. 62/294,199 filed on Feb. 11, 2016 and U.S. Provisional Patent Application Ser. No. 62/295,384 filed on Feb. 15, 2016, the contents of each are relied upon and incorporated herein by reference in their entireties.

BACKGROUND

Field

The present disclosure relate to extrusion components such as dies and methods of using same to make honeycomb bodies and, more particularly, to extrusion dies to extrude ceramic compositions, and methods of manufacturing honeycomb bodies of ceramic compositions using same.

Discussion of the Background

The manufacture of ceramic honeycomb bodies may be accomplished by the process of extruding ceramic powder batch mixtures through honeycomb extrusion dies to form honeycomb extrudate, and drying and firing the extrudate to produce ceramic honeycombs of high strength and thermal durability. The ceramic honeycombs thus produced are widely used as ceramic catalyst supports and wall-flow particulate filters for cleaning fluids.

Honeycomb extrusion dies can comprise a plurality of feedholes and an array of pins that are spaced apart to define a honeycomb network of discharge slots. The die may be mounted to portions of an extrusion apparatus to extrude the honeycomb bodies from the batch of ceramic and/or ceramic-forming material.

The above information disclosed in this Background section is only for enhancement of understanding of the background of the disclosure and therefore it may contain information that does not form any part of the prior art nor what the prior art may suggest to a person of ordinary skill in the art.

SUMMARY

Embodiments of the present disclosure provide a honeycomb extrusion die.

Embodiments of the present disclosure also provide a honeycomb extrusion die assembly.

Additional features of the disclosure will be set forth in the description which follows, and in part will be apparent from the description, or may be learned by practice of the disclosure.

An embodiment disclosed herein a honeycomb extrusion die assembly, comprising a die body comprising an inlet surface and a discharge surface opposite the inlet surface, and a forming plate disposed on the die body inlet surface. The die body further comprises a skin forming region of the discharge surface, feedholes extending from the inlet surface into the die body, and an intersecting array of discharge slots extending into the die body from the discharge surface to connect with the feedholes at intersections within the die body, the intersecting array of discharge slots being formed by side surfaces of a plurality of pins bounded by the slots and extending into the die body from the discharge face. The skin forming region comprises a first step extending into the die body and a second step disposed toward an outer periphery from the first step extending further into the die body than the first step. At least some of the side surfaces of the pins forming the walls of the slots comprise a divot spaced apart from the feedhole-slot intersection and spaced apart from the discharge surface, and wherein the plurality of slots comprise: a first group of the slots comprising a width W1 between adjacent pins at the discharge surface, and a second group of the slots comprising a second width W2, greater than W1, between adjacent pins at the discharge surface, wherein W2 is constant from the discharge surface to the divot. The forming plate disposed on the die body inlet surface blocks a feedhole corresponding to the first step at the discharge surface and does not block a feedhole corresponding to the second step at the discharge surface.

It is to be understood that both the foregoing general description and the following detailed description are explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate embodiments of the disclosure, and together with the description serve to explain the principles of the disclosure.

DETAILED DESCRIPTION

Figure 1:
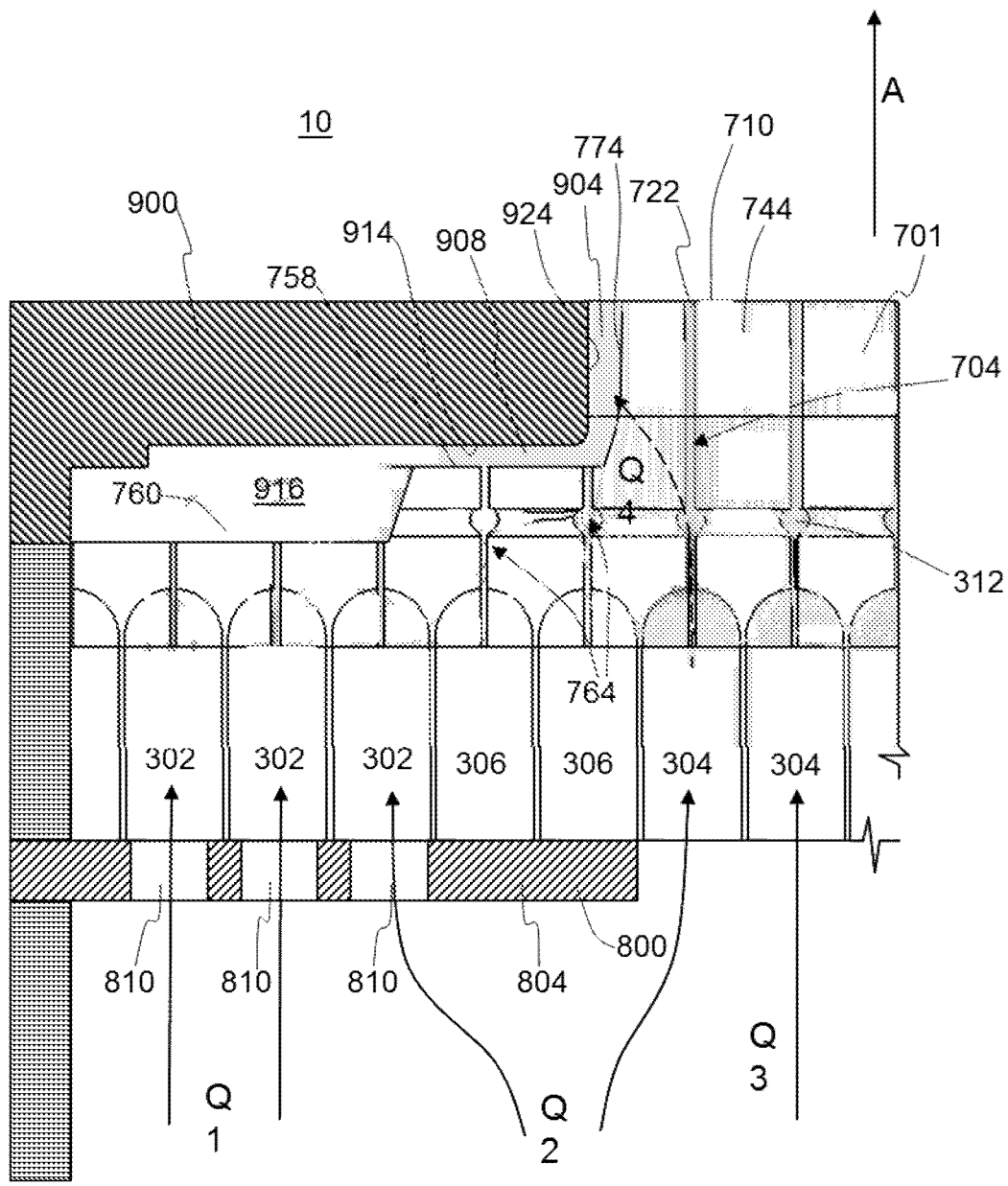
FIG. 1 is a schematic cross section illustration of a honeycomb extrusion die assembly according to embodiments of the disclosure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

Like reference numerals in the drawings denote like elements. It will be understood that for the purposes of this disclosure, "at least one of X, Y, and Z" can be construed as X only, Y only, Z only, or any combination of two or more items X, Y, and Z.

The manufacture of porous ceramic honeycomb bodies may be accomplished by the process of plasticizing ceramic powder batch mixtures, extruding the mixtures through honeycomb extrusion dies to form honeycomb bodies, and cutting, drying, and firing the bodies to produce porous ceramic honeycomb bodies of high strength and thermal durability having channels extending axially from a first end face to a second end face. Upon exiting the extruder in an axial direction, the batch stiffens into a wet extrudate comprising a network of axially extending intersecting walls (webs) that form axially extending channels and an axially extending outer peripheral surface. The webs and channels comprise the matrix. Disposed at the outer periphery of the matrix is the outer peripheral surface. The outer peripheral surface can be provided by an co-extruded skin or an integrally formed co-extruded skin, or in general skin. A porous ceramic honeycomb body formed from a green ware honeycomb body extruded with the skin on the matrix, as well as the green honeycomb body, can be referred to as an extrude-to-shape honeycomb body. As used herein a ceramic honeycomb body includes ceramic honeycomb monoliths and ceramic segmented honeycomb bodies, as well as the honeycomb body segments. As used herein honeycomb body can refer to a wet or dried green ware, or fired ware, honeycomb extrudate, honeycomb log, honeycomb piece, or honeycomb article.

A co-extruded or an after-applied exterior skin may form an outer peripheral surface extending axially from a first end face to a second end face of the ceramic honeycomb body. Each channel of the honeycomb body defined by intersecting walls (such as webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalyst supports, membrane supports, as wall-flow filters, as partial filters, and as combinations thereof for cleaning fluids such as purifying engine exhausts.

Ceramic honeycomb body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded zeolite or other extruded catalyst.

Embodiments of the disclosure relate to a honeycomb extrusion die assembly. The extrusion die assembly can comprise a honeycomb extrusion die (die) and a forming plate (flow control device). Embodiments can further comprise a skin forming mask. U.S. Pat. No. 8,348,659, issued on Jan. 8, 2013, the entire contents of which is hereby incorporated by reference as if fully set forth herein, describes a mask and a forming plate.

FIG. 1 is a schematic cross section illustration of a honeycomb extrusion die assembly 10 according to embodiments of the disclosure. The honeycomb extrusion die assembly 10 comprises a honeycomb extrusion die 701, a mask 900 disposed downstream from the honeycomb extrusion die 701 in a batch flow direction indicated by arrow "A", and a forming plate 800 disposed upstream from the honeycomb extrusion die 701 in the batch flow direction. The honeycomb extrusion die 701 comprises slots comprising a divot 312 spaced toward a discharge surface 710 from the intersection with the feedholes 304, and a wide portion 722 extending into the die 701 at the discharge surface 710 in a reinforcement zone disposed toward a die periphery from nominal slots with divots but without the wide portion 722 at the discharge face 710, a first peripheral step 758, a second peripheral step 760 disposed toward the die periphery from the first peripheral step 758, and a skin forming surface 744 disposed between the discharge surface 710 and the first peripheral step 758. The mask 900 comprises a diversion surface 914 facing the discharge surface at the first peripheral step 758 and the second peripheral step 760 in the discharge surface, and a guide surface 924 facing the skin forming surface 774. The forming plate 800 comprises flow holes 810 disposed radially outward from a block section 804. The block section 804 is disposed on peripheral feedholes 306 of the honeycomb extrusion die 701 to block batch flow Q2 to the peripheral feedholes 306 that feed batch to slots 764 that extend into the die body from the first peripheral step 758. The flow holes 810 are disposed to provide batch flow Q1 to peripheral feed holes 302 of the honeycomb extrusion die 701 that feed batch to slots that extend into the die body from the second peripheral step 760 in the discharge surface.

The forming plate 800 can be disposed on the upstream side of the die and effectively alters the flow path of batch Q2 on the downstream side of the die 701 in a skin region 904, 908 between the mask 900 and a discharge surface of the die 758, and between a skin forming surface of the die (skin ramp) 774 and the mask 924. The forming plate 800 can prevent or restrict batch flow Q2 from entering any number of feedholes 306, while allowing other areas of flow Q1 and Q3 to be unimpeded to fill a space 916 between the diversion surface 914 and the second peripheral step 760 and to fill slots 704 in the reinforcement zone and the nominal slots in the bulk zone. As disclosed herein the forming plate 800 can limit flow to feedholes 306 that provide flow to the skin ramp 904 and region under the mask 908 that is in close proximity to the skin ramp 744, for example, within about two cells distance from the skin ramp 744 as illustrated in FIG. 1. In at least some embodiments, limiting batch flow to those specific areas can avoid resulting particle misalignment within portions of the honeycomb body (such as due to misalignment of platy batch particles, such as platy talc) in the extrude-to-shape skin at the skin to matrix intersections, such as due to flow from web slots 764 into the skin which may contribute to misalignment of high aspect ratio particles, such as talc, in the ceramic paste. Misalignment of high aspect ratio particles can result in the subsequent random crystal structure upon firing, increasing the skin CTE. An average tangential CTE difference between the skin and matrix of the honeycomb body generates skin stress that can lead to skin fissures.

Preferably the same amount of batch arrives to the skin ramp 904 and region under the mask 908 that is in close proximity to the skin ramp to fill the volume under the mask, arriving primarily from a different flow path, such that the misalignment of particles can be avoided. The forming plate 800 can alter the flow path to direct more batch flow Q2 around the feed holes 306 metered by the forming plate to result in less flow from web slots 764 into the skin 904 and thus limit misalignment of the high aspect ratio particles.

Figure 2:
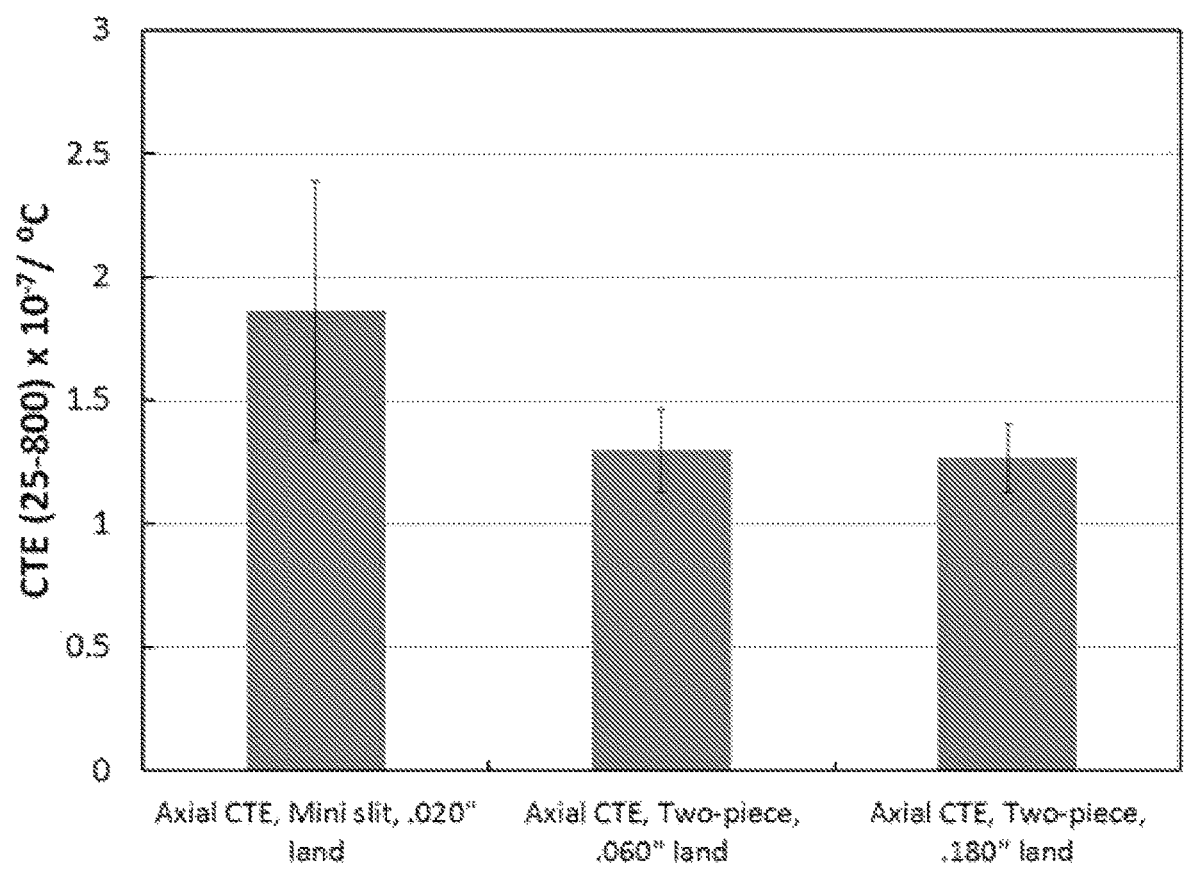
FIG. 2 provides a graphical plot of experimental data showing tangential coefficient of thermal expansion (CTE) in 20 mil (0.51 mm) ribbons extruded with various land lengths.

To provide the desired batch flow from an alternate path Q1, Q3, Q4, a longer flow path under the mask is utilized, and the impedance (or resistance) of that path can be greater and this can lead to underfed or inadequate mass flow to fill the volume under the mask. To compensate for such higher impedance flow path, a 'step cut' 758, 760 type of skin former cut on the downstream side of the die can be utilized. This 'step cut' 758, 760 incorporates a second deeper cut 760 that is located at a radius that is greater than the outer blocked edge of the forming plate 804, and can extend out to the periphery. Such a deeper cut 760 on the front of the die has an effect of lowering the batch flow resistance because the slots cause the greatest flow resistance of any of the die features that the batch flow encounters as it travels through the die. With the lower flow resistance in the step cut 760, the batch can flow through the longer path under the mask 900, with adequate volume and velocity to fill the skin former volume 904, 908 when the forming plate 800 is attached to the upstream side of the die 701. FIG. 2 presents lab results showing the impact of longer path (land) 758 lengths on an extruded ribbon's (skin) CTE (resulting tangential CTE in 20-mil ribbons extruded with various land lengths.). Based on this lab work, it can be seen that a minimum "skin" path length can be identified to provide adequate particle alignment. Here minimum land 758 length was found to be 1.5 mm (0.060") on a high aspect talc composition used to form honeycomb body with a 2 mil (0.002 in or 0.051 mm) wall. Increased CTE and misalignment was observed in shorter path length of 0.020 in (0.51 mm).

An extrusion die, such as formed of a high strength material such as stainless steel, includes a die body provided with feedholes into which a plasticized ceramic batch material is introduced into the die. Connecting with the feedholes are discharge slots terminating on a discharge face of the die from which the plasticized batch material is discharged in the form of the honeycomb extrudate having an outer extruded skin surrounding the shape and adhering to peripheral walls.

For the purpose of producing stronger peripheral walls having greater thickness than interior walls, widened peripheral discharge slots are provided. Slot widening can be accomplished by, for example, plunge EDM machining with a tab electrode of a suitable width. Thus, slot widening results in a thickened peripheral honeycomb body wall which can impart added strength to the dried and fired honeycomb structure. However, there is the possibility of distortion of the thickened peripheral walls, such distortion interfering with the desired strengthening and in some cases reducing the strength of the fired honeycomb bodies.

Embodiments of the disclosure relate to a new die design comprising at least some of the die slots each with a divot spaced toward a discharge surface from the intersection with the feedholes and a wide portion at the discharge surface extending into the die body to the divot in a peripheral region surrounding a bulk region of nominal slot width at the discharge surface to strengthen a peripheral region of a honeycomb extrudate according to embodiments of the disclosure. These embodiments exploit the interaction between a wider slot portion and a divot, which helps, for example, to avoid bi-stable state of batch flow and added pressure from batch on batch flow and to provide the impedance profile needed for correct batch flow in the wide slot portions of the reinforcement region. According to these embodiments, the die is capable of producing honeycomb bodies with progressively increased wall width towards the outer periphery. According to these embodiments, extrusion through the die exhibits well filled peripheral die slots leading to meeting target wall thickness in the reinforcement region of the honeycomb body and which can help to avoid extrusion defects such as wall distortion near the periphery and tearing between the reinforcement region and the bulk region of the honeycomb body.

According to these embodiments the divot can be disposed at a location along the depth of the slot to provide peripheral flow to improve bulk flow balance while maintaining the contributions of the divot toward reduced flow defects such as non-knitters and warped webs and subsequent firing defects such as cracks in the porous ceramic walls, and the reinforcement region helping to provide improved strength to the honeycomb body such as higher isostatic strength and/or reduced chipping.

The increased batch flow through the wide portion 722 at the discharge surface 710 extending into the die body to the divot 312 in a peripheral region also provides batch flow Q4 to the skin region as shown in FIG. 1. The additional batch flow Q4 from these cut-to-divot slots 704 over the batch flow from nominal slots or slots comprising the wide portion at the discharge surface extending into the die body, but not all the way to the divot, together with the additional batch flow from the step cut skin former die discharge surface 760, 758, adequately supplies the skin forming region 908, 904 with batch that may be starved by the forming plate 800, while simultaneously reducing or eliminating the short flow path in the skin forming region that could lead to misalignment of high aspect ratio batch particles. Preferably, skin fissures and tears are reduced or eliminated while the difference between the skin CTE and matrix CTE is reduced in the honeycomb body. The cut-to-divot wide slots 722, the step cut skin former die discharge surface 760, 758, and the forming plate 800 can thus provide a synergy in at least some embodiments to lower the average tangential CTE difference between the skin and matrix of the honeycomb body, and therefore preferably reducing the quantity, length, and/or width of skin fissures.

In some embodiments the honeycomb body can comprise cell walls of between about 100 and 1200 cells per square inch (cpsi), and the die 701 with a corresponding density of slots. Typical cell wall thicknesses and corresponding die slot widths can range from about 0.025 mm to about 1.5 mm (about 1 to 60 mil). For example, honeycomb body 200 and die 700 geometries may be 400 cpsi with a wall/slot thickness of about 8 mil (400/8) or with a wall/slot thickness of about 6 mil (400/6). Other geometries include, for example, 100/17, 200/12, 200/19, 270/19, 350/3, 400/3, 400/4, 500/2, 600/2, 600/3. 600/4, 750/2, 900/2, 900/3, 1200/2, and even 750/1 and 900/1. Honeycomb body 200 can have cell walls and cells of square structure or, for example, hexagonal, octagonal, triangular, rectangular or any other suitable cell shape may be used. Also, while the outer periphery cross section of the cellular honeycomb body 200 may be circular, it is not so limited, for example, the cross section can be elliptical, square, rectangular, or other desired shape, and a combination thereof.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:
1. A honeycomb extrusion die assembly, comprising:
   a die body, comprising:
      an inlet surface and a discharge surface opposite the inlet surface;
      a skin forming region of the discharge surface, comprising:
         a first step extending into the die body and a second step disposed toward an outer periphery from the first step extending further into the die body than the first step;
      feedholes extending from the inlet surface into the die body;
      an intersecting array of discharge slots extending into the die body from the discharge surface to connect with the feedholes at intersections within the die body, the intersecting array of discharge slots being formed by side surfaces of a plurality of pins bounded by the slots and extending into the die body from the discharge face, wherein at least some of the side surfaces of the pins forming the walls of the slots comprise a divot spaced apart from the feedhole-slot intersection and spaced apart from the discharge surface, and wherein the plurality of slots comprise:

a first group of the slots comprising a width W1 between adjacent pins at the discharge surface, and a second group of the slots comprising a second width W2, greater than W1, between adjacent pins at the discharge surface, wherein W2 is constant from the discharge surface to the divot;

a forming plate disposed on the die body inlet surface to block a feedhole corresponding to the first step at the discharge surface and not block a feedhole corresponding to the second step at the discharge surface.

2. The honeycomb extrusion die of claim 1, wherein the first group of the slots comprises at least some of the divots and W1 is constant from the discharge surface to the divot.

3. The honeycomb extrusion die of claim 1, wherein W1 is constant from the feedhole-slot intersection to the divot.

4. The honeycomb extrusion die of claim 1, wherein the slots in the second group of the slots are disposed toward a peripheral region of the die from the first group of the slots.

5. The honeycomb extrusion die of claim 1, wherein the second group of the slots surrounds the first group of the slots.

\* \* \* \* \*